United States Patent
Matsuda et al.

(10) Patent No.: US 7,087,673 B2
(45) Date of Patent: Aug. 8, 2006

(54) FLUORORUBBER COMPOSITIONS AND ARTICLES THEREOF

(75) Inventors: Takashi Matsuda, Gunma-ken (JP); Yasuhisa Osawa, Gunma-ken (JP); Noriyuki Koike, Gunma-ken (JP); Yasunori Sakano, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 458 days.

(21) Appl. No.: 10/337,290

(22) Filed: Jan. 7, 2003

(65) Prior Publication Data

US 2004/0006160 A1    Jan. 8, 2004

(30) Foreign Application Priority Data

Jan. 8, 2002    (JP) .............................. 2002-001257

(51) Int. Cl.
- *C08L 27/12* (2006.01)
- *C08F 114/18* (2006.01)
- *C08K 5/14* (2006.01)

(52) U.S. Cl. ..................... 524/544; 525/326.3; 525/387

(58) Field of Classification Search ................ 524/544, 524/546; 525/326.3, 387

See application file for complete search history.

(56) References Cited

U.S. PATENT DOCUMENTS

| 5,696,189 A | 12/1997 | Legare |
| 6,297,339 B1 | 10/2001 | Osawa et al. |
| 6,576,701 B1 * | 6/2003 | Osawa et al. ............... 524/520 |
| 2001/0008914 A1 | 7/2001 | Osawa et al. |

FOREIGN PATENT DOCUMENTS

| EP | 0 636 663 A2 | 2/1995 |
| EP | 0 656 391 A2 | 6/1995 |
| EP | 0 688 762 A2 | 12/1995 |
| EP | 0 967 251 A1 | 12/1999 |
| JP | 06025498 A * | 2/1994 |
| JP | 2001-106893 A | 4/2001 |
| JP | 2002188003 A * | 7/2002 |
| WO | WO 00/78871 A1 | 12/2000 |
| WO | WO 02/44264 A2 | 6/2002 |

OTHER PUBLICATIONS

Machine Translation JP 06-025498 A (1994).*
Machine Tranlsation JP 2002-188003 A (2002).*

* cited by examiner

*Primary Examiner*—Callie Shosho
(74) *Attorney, Agent, or Firm*—Birch, Stewart, Kolasch & Birch, LLP

(57) ABSTRACT

A crosslinkable fluororubber composition comprising (A) a polymer of the formula: $Z-(Rf-Q)_n-Rf-Z$ wherein n is an integer of at least 1, Rf is a divalent perfluoroalkylene or perfluorooxyalkylene radical, Q is a divalent organic radical, and Z is a monovalent organic radical, having a viscosity of at least 1,000 Pa·s at 25° C., (B) a reinforcing filler, and (C) a peroxide crosslinking agent is effectively roll milled and experiences minimal changes of viscosity after milling. Molded parts can be produced on a mass scale.

4 Claims, No Drawings

FLUORORUBBER COMPOSITIONS AND ARTICLES THEREOF

This nonprovisional application claims priority under 35 U.S.C. § 119(a) on Patent Application No. 2002-001257 filed in JAPAN on Jan. 8, 2002, which is herein incorporated by reference.

This invention relates to crosslinkable fluororubber compositions which can be effectively roll milled and crosslinked with peroxides into cured products having improved solvent resistance, chemical resistance, heat resistance and low-temperature properties, and articles comprising the cured compositions.

BACKGROUND OF THE INVENTION

Prior art vinylidene fluoride base fluororubbers are used in a variety of applications mainly in the automobile and mechanical industries since they are elastomers having good heat resistance, chemical resistance and mechanical strength.

These fluororubbers, however, are not satisfactory in chemical resistance. They are readily swollen in polar solvents such as ketone, lower alcohol, carbonyl and organic acid solvents. They are deteriorated by amine-containing chemicals so that their rubber strength and elongation may substantially decline. With respect to low-temperature properties, the fluororubbers lose rubber elasticity at temperatures below −20° C. to such an extent that they cannot be used as sealants. This generally imposes a limit on the use of fluororubbers in cold areas.

In order to eliminate these drawbacks, curable fluorine-containing compositions comprising a perfluoro compound and a fluorinated organohydrogenpolysiloxane as main components were proposed. These compositions are liquid because they are based on liquid perfluoro compounds having a low degree of polymerization. Then the compositions are suitable in the formed in-place gasket (FIPG) process and liquid injection molding system (LIMS), but less effective in compression molding conventionally employed for rubber molding.

In particular, the curable fluorine-containing compositions often prohibit the use of conventional two-plate molds for rubber because of the difficulty of molding and the frequent occurrence of defects by air entrapment. Steady production is difficult unless a special LIMS mold is newly fabricated. The LIMS mold, however, has the problems that it is generally more expensive than the conventional two-plate molds for rubber, the mounting of the mold in a LIMS molding machine is cumbersome, and the molding machine requires time-consuming adjustment after mold mounting. The LIMS mold does not lend itself to the manufacture of a variety of parts in small quantities.

Under the circumstances, we previously proposed in U.S. Pat. No. 6,297,339 or EPA 0967251 a method for preparing a rubber composition of the type that can be roll milled and molded in a compression molding rubber mold, referred to as millable type composition, from a fluorinated curable composition comprising a perfluoro compound, a fluorinated organohydropolysiloxane, a filler and a surface treating agent.

This rubber composition is satisfactory when roll milled in a small scale, but in a mass production scale using 5 kg of more, generates heat during roll milling operation so that its temperature elevates. The heated composition becomes more sticky to the roll surface and interferes with roll working. When the rubber composition is held for a long period of time after the roll working, it changes its viscosity and becomes less flowable.

Continuing research works, we discovered that the roll working efficiency on a mass production scale of such rubber compositions can be improved using special surface treating agents. See JP-A 2001-106893.

It would be desirable if roll working efficiency was improved without a need for special surface treating agents.

SUMMARY OF THE INVENTION

Therefore, an object of the invention is to provide a fluororubber composition of the millable type which can be effectively roll milled and crosslinked with peroxide into products having improved solvent resistance, chemical resistance, heat resistance and low-temperature properties. Another object is to provide an article comprising the cured product of the composition.

According to the invention, there is provided a crosslinkable fluororubber composition comprising (A) 100 parts by weight of a polymer of the general formula (1):

$$Z\text{-}(Rf\text{-}Q)_n\text{-}Rf\text{-}Z \qquad (1)$$

wherein n is an integer of at least 1, Rf is a divalent perfluoroalkylene or perfluorooxyalkylene radical, Q is a divalent organic radical, and Z is a monovalent organic radical, having a viscosity of at least 1,000 Pa·s at 25° C., (B) 1 to 100 parts by weight of a reinforcing filler, and (C) an effective amount of a peroxide crosslinking agent. The composition is less sticky to the roll surface and thus can be effectively roll milled. The composition cures into a rubber product having improved physical properties.

In another aspect, the invention provides an article comprising the fluororubber composition in the cured state as a partial structure or entire structure.

DESCRIPTION OF THE PREFERRED EMBODIMENT

Component (A) of the crosslinkable fluororubber composition is a polymer of the general formula (1) having a viscosity at 25° C. of at least 1,000 Pa·s, preferably 2,000 to 100,000 Pa·s, and more preferably 2,000 to 10,000 Pa·s.

$$Z\text{-}(Rf\text{-}Q)_n\text{-}Rf\text{-}Z \qquad (1)$$

Herein n is an integer of at least 1, Rf is a divalent perfluoroalkylene or perfluorooxyalkylene radical, Q is a divalent organic radical, and Z is a monovalent organic radical.

The letter n is such a number as to give a viscosity in the above-defined range. Component (A) is desirably gum-like and a solution thereof in nonafluorobutyl methyl ether in a concentration of 10% by weight preferably has a kinematic viscosity of at least 2.0 mm²/s, more preferably 5 to 50 mm²/s, and most preferably 10 to 40 mm²/s.

Preferably, Rf in formula (1) is each independently a divalent perfluoroalkylene radical of the formula: $C_mF_{2m}$ wherein m is an integer of 2 to 15 or a divalent perfluorooxyalkylene radical selected from radicals of the following formulae (2), (3) and (4).

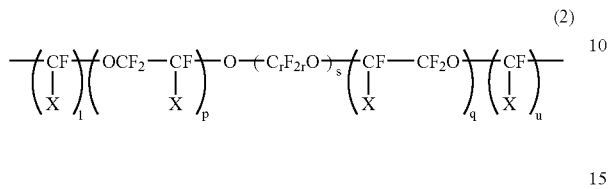

Herein X is each independently F or $CF_3$, r is an integer of 2 to 6, t and u each are 1 or 2, p and q each are an integer of 0 to 200, s is an integer of 0 to 6, with the proviso that p, q and s are not equal to 0 at the same time.

-continued

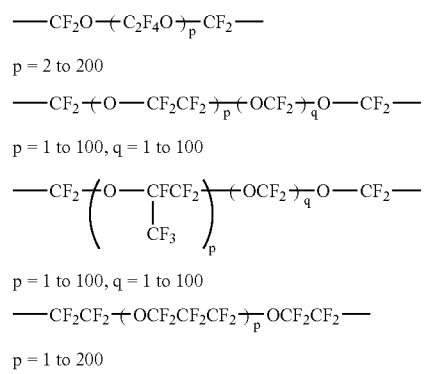

$p = 2$ to $200$ $p = 1$ to $100, q = 1$ to $100$ $p = 1$ to $100, q = 1$ to $100$ $p = 1$ to $200$

Q in formula (1) is preferably a radical of the formula (5):

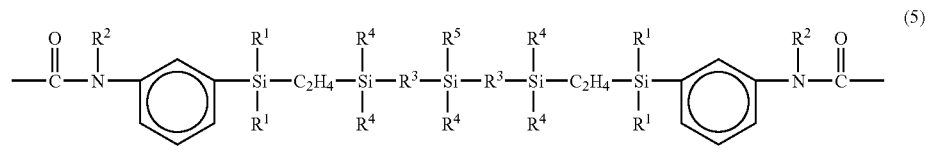

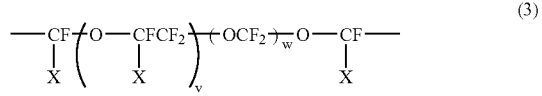

Herein X is as defined above, v and w each are an integer of 1 to 50.

$$-CF_2CF_2-(OCF_2CF_2CF_2)_y-OCF_2CF_2- \quad (4)$$

Herein y is an integer of 1 to 100.

The divalent perfluoroalkylene radicals may be straight or branched and include $-C_2F_4-$, $-C_3F_6-$, $-C_4F_8-$, $-C_6F_{12}-$, $-C_8F_{16}-$, $-C_{10}F_{20}-$, and $-C_2F_4CF(CF_3)C_4F_8-$, to name a few.

Examples of suitable divalent perfluorooxyalkylene radicals are given below.

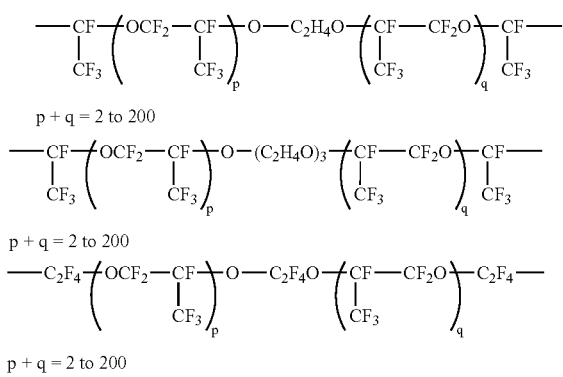

Herein $R^1$ is a monovalent hydrocarbon radical of 1 to 10 carbon atoms selected from among alkyl, cycloalkyl, aryl and aralkyl radicals, and substituted radicals of the foregoing in which some or all of the hydrogen atoms are substituted with halogen atoms;

$R^2$ is hydrogen or a monovalent hydrocarbon radical as defined for $R^1$;

$R^3$ is an oxygen atom or a divalent hydrocarbon radical of 1 to 8 carbon atoms selected from among alkylene, cycloalkylene and arylene radicals, substituted radicals of the foregoing in which some of the hydrogen atoms are substituted with halogen atoms, and combinations of alkylene and arylene radicals;

$R^4$ is a monovalent hydrocarbon radical as defined for $R^1$; and $R^5$ is a monovalent hydrocarbon radical as defined for $R^1$, or a monovalent hydrocarbon radical selected from among monovalent hydrocarbon radicals of 2 to 20 carbon atoms containing aliphatic unsaturation and substituted radicals thereof in which some or all of the hydrogen atoms are substituted with halogen atoms.

Examples of $R^1$, $R^2$ and $R^4$ $R^1$ and $R^4$ each are a monovalent hydrocarbon radical of 1 to 10 carbon atoms selected from among alkyl, cycloalkyl, aryl and aralkyl radicals, and substituted radicals of the foregoing in which some or all of the hydrogen atoms are substituted with halogen atoms, and $R^2$ is hydrogen or a monovalent hydrocarbon radical as defined for $R^1$. Examples of the monovalent hydrocarbon radicals represented by $R^1$, $R^2$ and $R^4$ include alkyl radicals such as methyl, ethyl, propyl, isopropyl, butyl, isobutyl, tert-butyl, hexyl, octyl and decyl; cycloalkyl radicals such as cyclopentyl, cyclohexyl and cycloheptyl; aryl radicals such as phenyl, tolyl, xylyl and naphthyl; aralkyl radicals such as benzyl, phenylethyl, phenylpropyl and methylbenzyl; and substituted ones of the foregoing in which some or all hydrogen atoms are substituted with halogen atoms, such as chloromethyl, chloropropyl, bromoethyl and trifluoropropyl.

Examples of $R^5$ $R^5$ is a monovalent hydrocarbon radical as defined for $R^1$, or a monovalent hydrocarbon radical of 2 to 20 carbon atoms containing aliphatic unsaturation. Examples of the monovalent hydrocarbon radical containing aliphatic unsaturation represented by $R^5$ include vinyl, propenyl, isopropenyl, butenyl, isobutenyl, hexenyl, cyclohexenyl and radicals of the following structures.

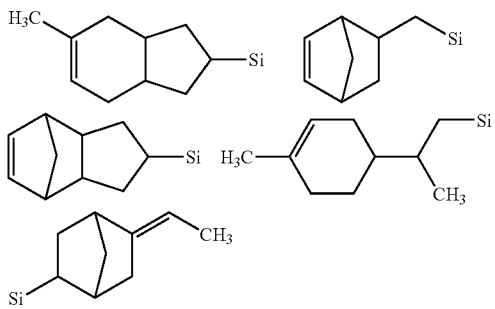

It is noted that Si is described in the above chemical formulae in order to indicate the bonding position to Si.

The substituted radicals of the foregoing in which some or all hydrogen atoms are substituted with halogen atoms are exemplified below.

Si—$C_2H_4C_2F_4CH=CH_2$
Si—$C_2H_4C_6F_{12}CH=CH_2$
Si—$C_2H_4C_5F_{10}CF=CHCH_3$
Si—$C_2H_4C_6F_{12}CF=CF_2$

It is noted that Si is described in the above chemical formulae in order to indicate the bonding position to Si.

Examples of Divalent Organic Radical $R^3$ $R^3$ is an oxygen atom or a divalent hydrocarbon radical of 1 to 8 carbon atoms. Suitable divalent hydrocarbon radicals include alkylene radicals such as methylene, ethylene, propylene, methylethylene, butylene and hexamethylene; cycloalkylene radicals such as cyclohexylene; arylene radicals such as phenylene, tolylene and xylylene; and substituted radicals of the foregoing in which some hydrogen atoms are substituted with halogen atoms, and combinations of alkylene and arylene radicals as illustrated above.

Z in formula (1) is preferably a monovalent organic radical, typically hydrocarbon radical, of 1 to 30 carbon atoms which may be separated by an atom selected from among oxygen, nitrogen, sulfur and silicon and in which some or all of the hydrogen atoms may be substituted with halogen atoms. Examples include alkyl radicals such as methyl, ethyl, propyl, isopropyl, butyl, isobutyl, tert-butyl, pentyl, neopentyl, hexyl, heptyl, octyl, nonyl and decyl; cycloalkyl radicals such as cyclopentyl, cyclohexyl and cycloheptyl; aryl radicals such as phenyl, tolyl, xylyl and naphthyl; aralkyl radicals such as benzyl, phenylethyl and phenylpropyl; substituted ones of the foregoing in which some or all hydrogen atoms are substituted with halogen atoms (e.g., fluoro, chloro and bromo), such as chloromethyl, bromoethyl, chloropropyl, trifluoropropyl, 3,3,4,4,5,5,6,6,6-nonafluorohexyl; and the foregoing radicals containing an intervening ether bond, amide bond, ester bond, urethane bond, sulfonylamide bond, siloxane bond or the like.

Component (B) of the fluororubber composition according to the invention is a reinforcing filler. The reinforcing filler is generally added for the purposes of improving roll workability, mechanical strength, thermal stability, weather resistance, chemical resistance and flame retardance, reducing thermal shrinkage upon curing, and/or reducing the coefficient of thermal expansion and gas permeability of an elastomer as cured. The filler is mainly added for the purpose of improving roll workability and mechanical strength in order to provide a rubber composition of the millable type.

The fillers include fumed silica, colloidal silica, diatomaceous earth, quartz flour, glass fibers, and carbon black as well as metal oxides such as iron oxide, titanium oxide and cerium oxide and metal carbonates such as calcium carbonate and magnesium carbonate. The fillers may have been treated with various surface treating agents. Among others, fumed silica and carbon black are preferred for mechanical strength. Fumed silica treated with a surface treating agent in the form of a compound containing silicon in a molecule such as a silane is especially preferred because it is readily dispersible.

The amount of the reinforcing filler blended is 1 to 100 parts by weight per 100 parts by weight of the polymer. Less than 1 part of the filler is insufficient to provide reinforcement and improve roll workability whereas more than 100 parts of the filler detracts from rubber flexibility and prevents the rubber from being wrapped on rolls.

Component (C) is a peroxide crosslinking agent. Examples include dibenzoyl peroxide, dicumyl peroxide, di-t-butyl peroxide, t-butylperoxyacetate, t-butylperoxybenzoate, 2,5-dimethyl-2,5-bis-t-butylperoxyhexane, t-butylperoxyisopropyl monocarbonate, t-butylperoxy-2-ethylhexyl monocarbonate, and 1,6-hexanediol bis-t-butylperoxycarbonate. Of these, 2,5-dimethyl-2,5-bis-t-butylperoxyhexane, t-butylperoxyisopropyl monocarbonate, t-butylperoxy-2-ethylhexyl monocarbonate, and 1,6-hexanediol bis-t-butylperoxycarbonate are preferred from the standpoints of effective crosslinking, shelf stability and scorch prevention.

The peroxide crosslinking agent is added in a sufficient amount to cure component (A), preferably 0.1 to 5 parts by weight, more preferably 0.5 to 3 parts by weight per 100 parts by weight of component (A). Less than 0.1 part of the peroxide may induce insufficient or slow crosslinking whereas more than 5 parts may adversely affect the physical properties of rubber.

In the composition, various additives such as internal parting agents, wetting agents, pigments and dyes may be added for the purpose of enhancing its practical utility, if necessary.

The fluororubber composition of the invention can be prepared by a method including the steps of (a) adding the filler (B) to the polymer (A), then (b) adding the crosslinking agent (C) thereto.

Using a rubber kneader, pressure kneader, Banbury mixer or twin-roll rubber mill as commonly employed in blending of conventional rubbers, step (a) carries out mixing of the polymer while adding the filler. This blending may be carried out at room temperature. If appropriate for the purpose of stabilizing shearing heat, heating may be done within the temperature range not causing decomposition of the polymer. Heating at about 100 to 300° C. for about 10 minutes to about 8 hours is desirable.

Step (b) is to blend the crosslinking agent (C) in the polymer compound. As the apparatus used in step (b), rubber kneaders, pressure kneaders and Banbury mixers are undesirable because of the risk of a scorching phenomenon that the heat generated by mixing drives crosslinking. Desirable are twin-roll rubber mills also capable of sheeting operation, especially equipped with cooling means for suppressing crosslinking from being driven by the heat generating during milling.

In curing the composition of the invention, preferred conditions for primary curing include a temperature of about 100 to 200° C. and a time of about 1 to 30 minutes. Temperatures below 100° C. take a longer curing time, which is undesirable for commercial production. Temperatures above 200° C. can induce scorching. The preferred temperature is in the range of about 100 to 200° C. and more preferably about 120 to 170° C. The curing time at such temperatures may be selected as appropriate to ensure that the crosslinking reaction is completed. In order to stabilize the physical properties of the inventive composition, secondary curing is preferably carried out by heating at a temperature of about 100 to 230° C. for a time of about 1 to 24 hours. Secondary curing at temperatures below 100° C. is ineffective whereas temperatures above 230° C. can cause pyrolysis. More preferably, secondary curing is carried out at about 150 to 200° C. for about 1 to 20 hours.

The fluororubber compositions of the invention can be used in a variety of applications. Due to a high fluorine content, they have excellent solvent resistance and chemical resistance, and low moisture permeability. Also, due to low surface energy, they have excellent parting properties and water repellency. The compositions thus find use as automotive rubber parts where oil resistance is required, for example, diaphragms such as fuel regulator diaphragms, pulsation damper diaphragms, oil pressure switch diaphragms, and EGR diaphragms, valves such as canister valves and power control valves, O-rings such as quick connector O-rings and injector O-rings, and seal members such as oil seals and cylinder head gaskets; chemical plant rubber parts, for example, pump diaphragms, valves, O-rings, hoses, packing members, oil seals, gaskets and other seal members; rubber parts for ink jet printers, rubber parts for semiconductor manufacturing lines, for example, diaphragms, valves, O-rings, packing members, gaskets and seal members for apparatus to come in contact with chemicals, and valves which are required to have low friction and abrasion resistance; rubber parts for analytical and experimental equipment, such as pump diaphragms, valves, seal members (e.g., O-rings and packing);

rubber parts for medical equipment, such as pumps, valves and joints; and tent coating materials, sealants, molded parts, extruded parts, coats, copier roll materials, electrical moisture-proof coatings, sensor potting materials, fuel cell sealing materials, and laminate rubber fabrics.

EXAMPLE

Examples of the invention are given below by way of illustration and not by way of limitation. In Examples, all parts are by weight.

The materials used in Examples are as shown below.

Polymer 1

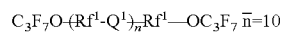

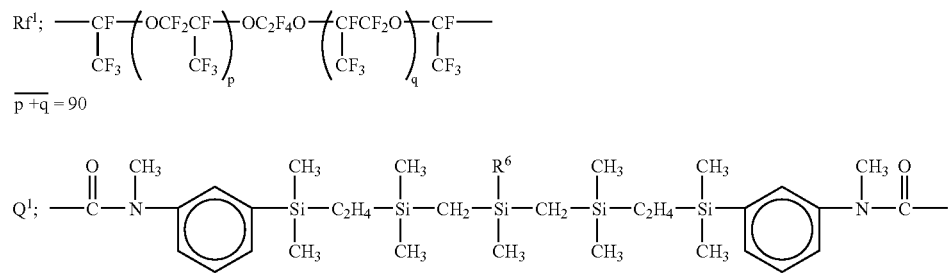

$R^6$ is a mixture of $C_8F_{17}C_2H_4-$ and $CH_2=CHC_6F_{12}C_2H_4-$ in a ratio of 5:5.

Polymer 2

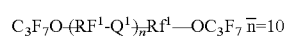

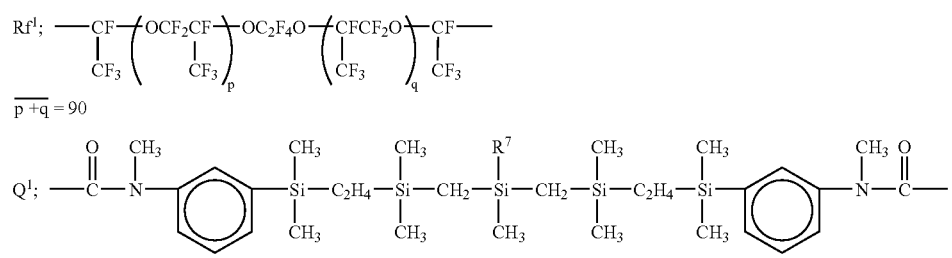

$R^7$ is a mixture of methyl and $CH_2$=$CHC_6F_{12}C_2H_4$— in a ratio of 3:7.

Filler 1

R8200, fumed silica treated with a silicic surface treating agent, Nippon Aerosil Co., Ltd.

Filler 2

VP-NVX300, fumed silica treated with a silicic surface treating agent, Nippon Aerosil Co., Ltd.

Filler 3

R972, fumed silica treated with a silicic surface treating agent, Nippon Aerosil Co., Ltd.

Filler 4

Denka Black FX-35, carbon black, Denki Kagaku Kogyo Co., Ltd.

Peroxide Crosslinker

Perbutyl I, t-butylperoxyisopropyl monocarbonate, NOF Corporation.

Polymer 3

A gum-like polymer was obtained by feeding 100 parts of a polymer and 1.8 parts of a precure agent, shown below, thoroughly mixing them, adding 0.2 part of a hydrosilylation catalyst CAT-PL-50T (Shin-Etsu Chemical Co., Ltd.), thoroughly mixing again, and aging for 3 hours at room temperature.

Polymer (viscosity 4,300 cSt, vinyl content 0.013 mol/100 g)

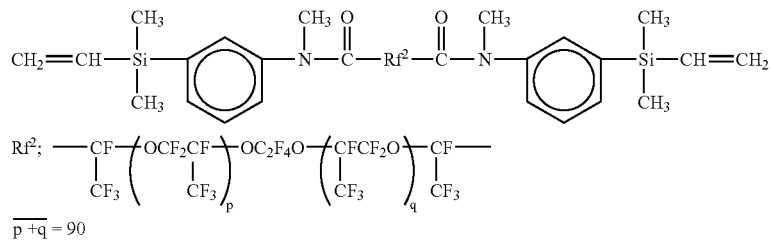

$\overline{p+q} = 90$

Precure Agent

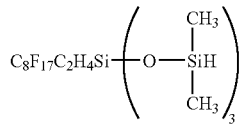

Surface Treating Agent

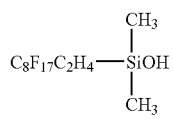

Examples 1–4

Fluororubber compositions were obtained by mixing ingredients as shown in Table 1 according to the following steps.

Step (a): Filler Blending

The polymer was fed to a 300-cc laboratory kneader where the temperature was raised to 170° C., and the filler was added in the amount shown in Table 1. After the filler addition, kneading was continued for one hour at the same temperature, obtaining a base compound.

Step (b): Crosslinker Blending

The compound of step (a) was taken out of the kneader and wrapped around a twin-roll rubber mill where the peroxide crosslinker was blended as shown in Table 1, yielding a curable fluororubber composition. Roll workability was evaluated in terms of roll sticking.

Comparative Examples 1–2

Fluororubber compositions were obtained by mixing ingredients as shown in Table 1 according to the following steps.

Step (a): Filler Blending

The polymer was fed to a 300-cc laboratory kneader where the temperature was raised to 170° C., and the filler and surface treating agent were added in the amounts shown in Table 1. After the filler addition, kneading was continued for one hour at the same temperature, obtaining a base compound.

Step (b): Crosslinker Blending

The compound of step (a) was taken out of the kneader and wrapped around a twin-roll rubber mill where the peroxide crosslinker was blended as shown in Table 1, yielding a curable fluororubber composition. Roll workability was evaluated in terms of roll sticking.

The resulting fluororubber compositions were evaluated by the following tests, with the results shown in Table 1.

[Physical Properties]

A curable rubber composition was molded in a 75-ton rubber press mold at 150° C. for 10 minutes to form a rubber sheet of 2 mm thick, which was post cured at 200° C. for 4 hours. The sheet was measured for physical properties (hardness, elongation, tensile strength and tear strength) by the JIS rubber rating method.

[Roll Workability]

Using a 3-inch twin-roll rubber mill, 200 g of a rubber compound was milled for 20 minutes. Roll workability was rated according to the following criterion.

⊚: effective roll working with no sticking to rolls

○: some sticking to rolls, but workable without stopping roll rotation

Δ: sticking force increases with milling time, but removable on roll stoppage

X: sticking force increases with milling time, difficult removal even on roll stoppage

TABLE 1

|  |  | Example | | | | Comparative Example | |
|---|---|---|---|---|---|---|---|
|  |  | 1 | 2 | 3 | 4 | 1 | 2 |
| Components (pbw) | Polymer 1 | 100 | 100 |  |  |  |  |
|  | Polymer 2 |  |  | 100 | 100 |  |  |
|  | Polymer 3 |  |  |  |  | 100 | 100 |
|  | Filler 1 | 40 |  |  |  |  |  |
|  | Filler 2 |  | 30 |  | 25 | 30 | 30 |
|  | Filler 3 |  |  | 50 |  |  |  |
|  | Filler 4 |  |  |  | 10 |  |  |
|  | Surface treating agent |  |  |  |  |  | 6 |
|  | Peroxide crosslinker | 1.5 | 1.5 | 1.5 | 1.5 | 1.5 | 1.5 |
| Physical properties | Hardness (Shore A) | 68 | 68 | 72 | 74 | 65 | 68 |
|  | Elongation (%) | 250 | 240 | 200 | 210 | 220 | 190 |
|  | Tensile strength (MPa) | 9.3 | 10.3 | 8.6 | 9.8 | 7.4 | 6.8 |
|  | Tear strength (kN/m) | 15 | 17 | 12 | 15 | 15 | 13 |
|  | Roll workability | ◎ | ◎ | ◎ | ◎ | ○ | X |

It is seen that the compositions of Examples are outstandingly improved in roll workability without a need for surface treating agent and provide good physical properties after curing. The compositions of Comparative Examples are roll workable at an acceptable level when the surface treating agent is added, but are difficult to roll work in the absence of surface treating agent.

Since the fluororubber compositions of the invention are effectively roll milled and experience minimal changes of viscosity after milling, they are efficient to produce molded parts on a mass scale. Even molded parts of complex shape can be consistently manufactured on a mass scale. The invention is thus of great industrial worth.

Japanese Patent Application No. 2002-001257 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A crosslinkable fluororubber composition comprising:
(A) 100 parts by weight of a polymer, having a viscosity of at least 1000 Pa·s at 25° C., of the general formula (1):

$$Z-(Rf-Q)_n—Rf-Z \quad (1)$$

wherein n is an integer of at least 1, Rf is a divalent perfluoroalkylene or perfluorooxyalkylene radical selected independently from the group consisting of divalent perfluoroalkylene radicals of the formula $C_mF_{2m}$ wherein m is 2 to 15 and divalent perfluorooxyalkylene radicals selected from radicals of the following formulae (2), (3), and (4):

$$—(CXF)_t—(O—CF_2—CXF)_p—O—(C_rF_{2r}—O)_s—(CXF—CF_2—O)_q—(CXF)_u— \quad (2)$$

wherein each X is independently F or $CF_3$, r is an integer of 2 to 6, t and u each are 1 or 2, p and q each are an integer of 0 to 200, and s is an integer of 0 to 6, with the proviso that p, q, and s are not all equal to 0 at the same time, $$—CXF—(O—CXF—CF_2)_v—(O—CF_2)_w—O—CXF— \quad (3)$$

wherein X is as defined above, and v and w each are an integer of 1 to 50, $$—CF_2CF_2—(OCF_2CF_2CF_2)_y—OCF_2CF_2— \quad (4)$$

wherein y is an integer of 1 to 100,

Q is a radical of the formula (5):

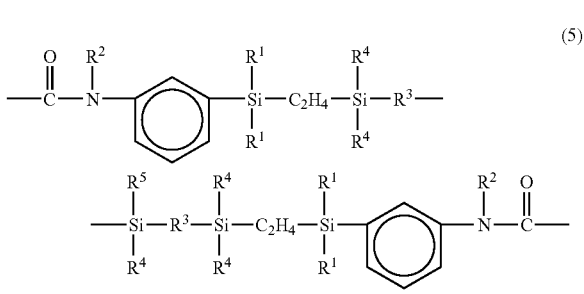

(5)

wherein $R^1$ is a monovalent hydrocarbon radical of 1 to 10 carbon atoms selected from the group consisting of alkyl, cycloalkyl, aryl, and aralkyl radicals, and substituted radicals of the foregoing in which some or all of the hydrogen atoms are substituted with halogen atoms; $R^2$ is hydrogen or a monovalent hydrocarbon radical as defined for $R^1$; $R^3$ is an oxygen atom or a divalent hydrocarbon radical of 1 to 8 carbon atoms selected from the group consisting of alkylene, cycloalkylene, and arylene radicals, substituted radicals of the foregoing in which some of the hydrogen atoms are substituted with halogen atoms, and combinations of alkylene and arylene radicals; $R^4$ is a monovalent hydrocarbon radical as defined for $R^1$; $R^5$ is a monovalent hydrocarbon radical as defined for $R^1$, or a monovalent hydrocarbon radical selected from the group consisting of monovalent hydrocarbon radicals of 2 to 20 carbon atoms containing aliphatic unsaturation and substituted radicals thereof in which some or all of the hydrogen atoms are substituted with halogen atoms, wherein at least one of Q has $R^5$ which is a monovalent hydrocarbon radical selected from the group consisting of monovalent hydrocarbon radicals of 2 to 20 carbon atoms containing aliphatic unsaturation, and Z is a monovalent hydrocarbon radical of 1 to 30 carbon atoms which may be separated by an atom selected from the group consisting of oxygen, nitrogen, sulfur, and silicon and in which some or all of the hydrogen atoms may be substituted with halogen atoms, said monovalent hydrocarbon radical being selected from the group consisting of alkyl, cycloalkyl, aryl, and aralkyl radicals, (B) 1 to 100 parts by weight of reinforcing filler, and
(C) 0.1 to 5 parts by weight of a peroxide crosslinking agent.

2. The composition of claim 1 wherein the reinforcing filler (B) is carbon black, fumed silica, or fumed silica treated with a silicon-containing surface treating agent.

3. An article comprising the fluororubber composition of claim 1 in the cured state as a partial structure or entire structure.

4. The article of claim 3 which serves as a seal member, O-ring, diaphragm, hose or coat.

* * * * *